United States Patent
Hasei

(10) Patent No.: US 7,527,368 B2
(45) Date of Patent: May 5, 2009

(54) IDENTIFICATION CODE, FORMATION METHOD OF IDENTIFICATION CODE, LIQUID DROPLET EJECTION APPARATUS, AND ELECTRO-OPTIC APPARATUS

(75) Inventor: Hironori Hasei, Okaya (JP)

(73) Assignee: Seiko Epson Corporation (JP)

( * ) Notice: Subject to any disclaimer, the term of this patent is extended or adjusted under 35 U.S.C. 154(b) by 322 days.

(21) Appl. No.: 11/362,578

(22) Filed: Feb. 24, 2006

(65) Prior Publication Data

US 2006/0192806 A1    Aug. 31, 2006

(30) Foreign Application Priority Data

Feb. 28, 2005    (JP)    ............... 2005-055112

(51) Int. Cl.
*B41J 2/17*    (2006.01)
(52) U.S. Cl. ........................................ 347/95
(58) Field of Classification Search ................ 235/454, 235/494; 434/112–115, 117
See application file for complete search history.

(56) References Cited

U.S. PATENT DOCUMENTS

| | | |
|---|---|---|
| 6,615,713 B1 | 9/2003 | Goda et al. |
| 6,681,055 B1 | 1/2004 | Sato |
| 7,198,816 B2 | 4/2007 | Masuda et al. |
| 2004/0175677 A1 * | 9/2004 | Koch et al. ................ 434/113 |
| 2004/0241340 A1 | 12/2004 | Sato et al. |
| 2006/0243713 A1 | 11/2006 | Sato et al. |

FOREIGN PATENT DOCUMENTS

| | | |
|---|---|---|
| JP | 11-077340 | 3/1999 |
| JP | 11-231547 | 8/1999 |
| JP | 11-271983 | 10/1999 |
| JP | 2001-083665 | 3/2001 |
| JP | 2003-127537 | 5/2003 |
| JP | 2003-243328 | 8/2003 |
| JP | 2004-200221 | 7/2004 |
| JP | 2004-050408 | 9/2004 |
| KR | 10-2004-0053776 | 6/2004 |

* cited by examiner

*Primary Examiner*—Luu Matthew
*Assistant Examiner*—Justin Seo
(74) *Attorney, Agent, or Firm*—Harness, Dickey & Pierce, P.L.C.

(57) ABSTRACT

An identification code is formed in a code formation area provided on a substrate. The code formation area is divided into a plurality of data cells. A plurality of dots are bonded with the substrate in such a manner that each of the dots is arranged in a predetermined data cell selected from the data cells. Each dot includes a projection formed in a peripheral portion of the dot and a flat portion formed in a center of the dot encompassed by the peripheral portion. The ratio of the thickness of the projection to the thickness of the flat portion is greater than 4 and smaller than 7. This structure improves the bonding strength of each dot with respect to the substrate.

9 Claims, 5 Drawing Sheets

IDENTIFICATION CODE, FORMATION METHOD OF IDENTIFICATION CODE, LIQUID DROPLET EJECTION APPARATUS, AND ELECTRO-OPTIC APPARATUS

CROSS-REFERENCE TO RELATED APPLICATIONS

This application is based upon and claims the benefit of priority from prior Japanese Patent Application No. 2005-055112, filed on Feb. 28, 2005, the entire contents of which are incorporated herein by reference.

BACKGROUND OF THE INVENTION

The present invention relates to identification codes, formation methods for identification codes, liquid droplet ejection apparatuses, and electro-optic apparatuses.

Normally, an electro-optic apparatus such as a liquid crystal display and an organic electroluminescence display (an organic EL display) includes a transparent glass substrate (hereinafter, a "substrate") for displaying an image. The substrate has an identification code (for example, a two-dimensional code), which represents product information including a manufacturer and a product number, for purposes of quality control and production control. The identification code includes a plurality of dots defined by, for example, colored thin films or recesses. The dots are arranged in such a manner as to form a predetermined pattern. The identification code is determined in correspondence with the arrangement pattern of the dots.

As a method for forming the identification code, Japanese Laid-Open Patent Publication No. 11-77340 discloses a laser sputtering method and Japanese Laid-Open Patent Publication No. 2003-127537 discloses a waterjet method. In the laser sputtering method, dots are deposited through sputtering by radiating a laser beam onto a metal foil. In the waterjet method, dots are marked by ejecting water containing abrasive onto a substrate.

However, in the laser sputtering method, the space between the metal foil and the substrate must be adjusted to several micrometers to several tens of micrometers in order to form each dot to a desired size. The substrate and the metal foil thus must have surfaces that are reliably formed flat. Further, adjustment of the space between the substrate and the metal foil must be carried out with high accuracy in the order of micrometers. This limits application of the method to a restricted range of substrates, and the use of the method is limited. In the waterjet method, the substrate may be contaminated by the water, dust, and the abrasive that are splashed when the identification code is formed.

In order to solve these problems, an inkjet method has been focused on recently. In the inkjet method, dots are provided by ejecting microdroplets of liquid containing metal particles onto the substrate by a liquid droplet ejection apparatus. The microdroplets are then dried and thus corresponding dots are formed. The method thus can be applied to a relatively wide range of substrates. Further, the method prevents contamination of the substrate when forming the identification code.

However, the dots formed by the inkjet method have relatively low bonding strength with the substrate and thus easily separate from the substrate. Thus, if the identification code contacts and scrapes against, for example, a surface of a transport stage, the dots may be peeled off from the substrate and thus cause loss of the product information marked on the substrate.

SUMMARY OF THE INVENTION

Accordingly, it is an objective of the present invention to provide an identification code that suppresses loss of information, a method for forming the identification code, a liquid droplet ejection apparatus that is used for forming the identification code, and an electro-optic apparatus provided with the identification code.

To achieve the above objective, one aspect of the present invention provides an identification code formed in a code formation area provided on a substrate. The identification code includes a plurality of data cells defined by dividing the code formation area and a plurality of dots bonded with the substrate in such a manner that the dots are arranged in predetermined data cells selected from the plurality of data cells. Each dot includes a projection formed in a peripheral portion of the dot. The projection is projected with respect to a center of the dot encompassed by the peripheral portion.

Another aspect of the present invention is a method for forming an identification code in a code formation area provided on a substrate. The method includes: ejecting liquid droplets containing a dot forming material onto predetermined data cells selected from a plurality of data cells that are defined by dividing the code formation area; forming a dot in each of the predetermined data cells by drying the liquid droplet received by the data cell; and heating a portion of the substrate corresponding to the code formation area to a predetermined temperature before the droplets are received by the corresponding data cells. The predetermined temperature is set to a value that allows a peripheral portion of each droplet to project with respect to a center of the droplet encompassed by the peripheral portion when the droplet is received by the data cell.

A further aspect of the present invention is an apparatus for ejecting liquid droplets containing a dot forming material so as to form an identification code in a code formation area provided on a substrate. The apparatus includes an ejection portion that ejects the droplets onto predetermined data cells selected from a plurality of data cells defined by dividing the code formation area, a heating device that heats a portion of the substrate corresponding to the code formation area, a temperature detector that detects the temperature of the portion of the substrate corresponding to the code formation area, and a controller that controls the heating device in correspondence with the temperature detected by the temperature detector in such a manner that the portion of the substrate corresponding to the code formation area is heated to a predetermined temperature before the droplets are received by the corresponding data cells. The predetermined temperature is set to a value that allows a peripheral portion of each droplet to project with respect to a center of the droplet encompassed by the peripheral portion when the droplet is received by the data cell.

Yet another aspect of the present invention is an electro-optic apparatus having a substrate provided with the identification code as described above.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A liquid crystal display 1, or an electro-optic apparatus according to the present invention, will first be described with reference to FIG. 1, the front view showing the liquid crystal display 1.

Figure 1:
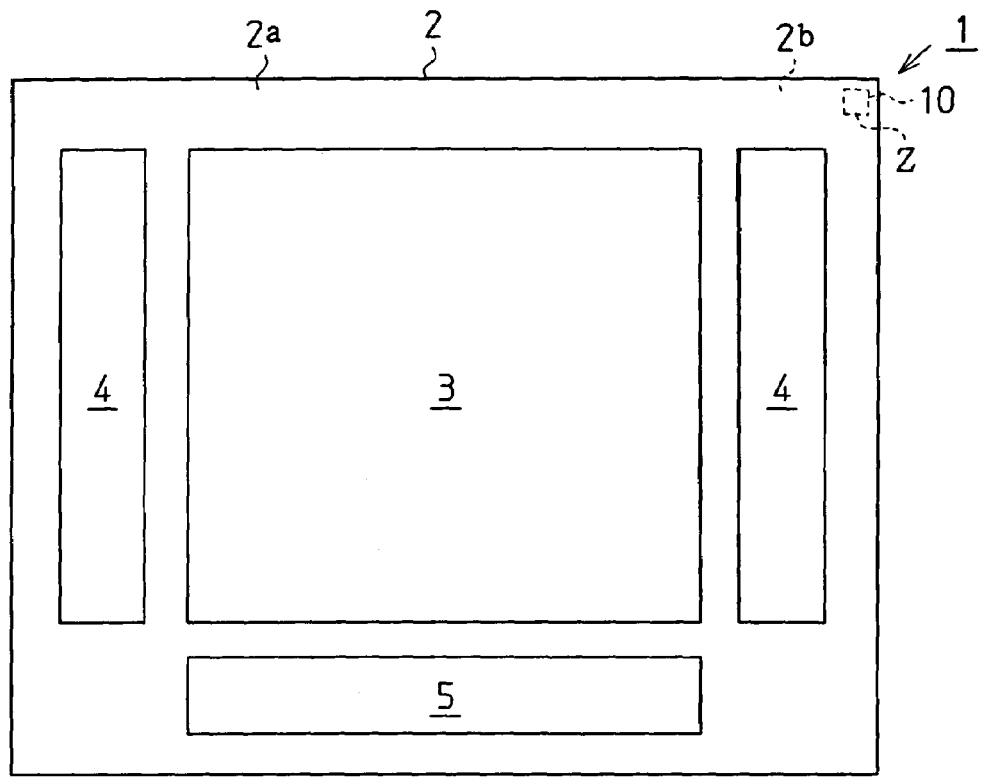
FIG. 1 is a front view showing a liquid crystal display.

As shown in FIG. 1, the liquid crystal display 1 has a transparent glass substrate (hereinafter, a "substrate") 2 serving as a display substrate. The substrate 2 has a surface 2a including a rectangular display portion 3 in which liquid crystal molecules are sealed. Scanning line driver circuits 4 and a data line driver circuit 5 are formed outside the display portion 3. Each of the scanning line driver circuits 4 generates a scanning signal, and the data line driver circuit 5 generates a data signal. In correspondence with these signals, the liquid crystal display 1 controls orientation of the liquid crystal molecules. In correspondence with such orientation, area light radiated by a non-illustrated illumination device is modulated. In this manner, the display portion 3 displays a desired image.

Figure 2:
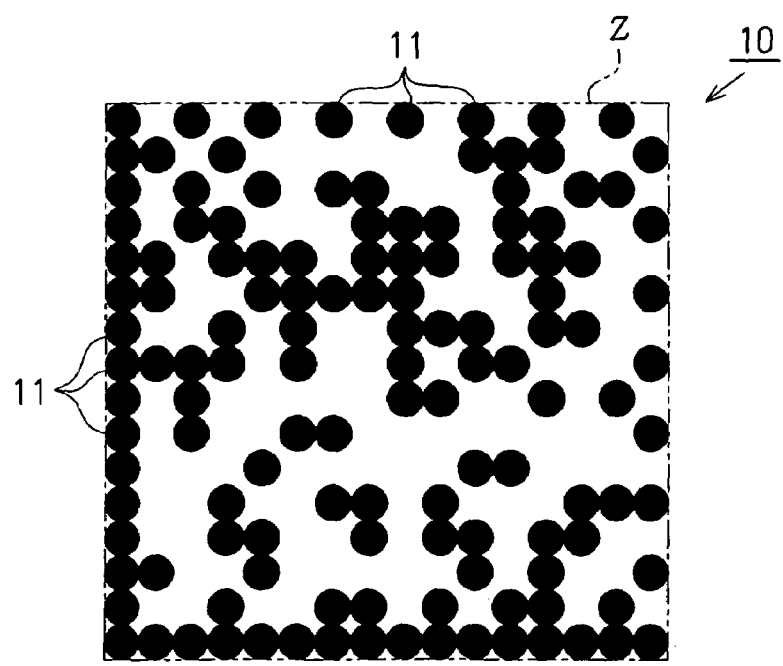
FIG. 2 is a front view showing an identification code.
Figure 3:
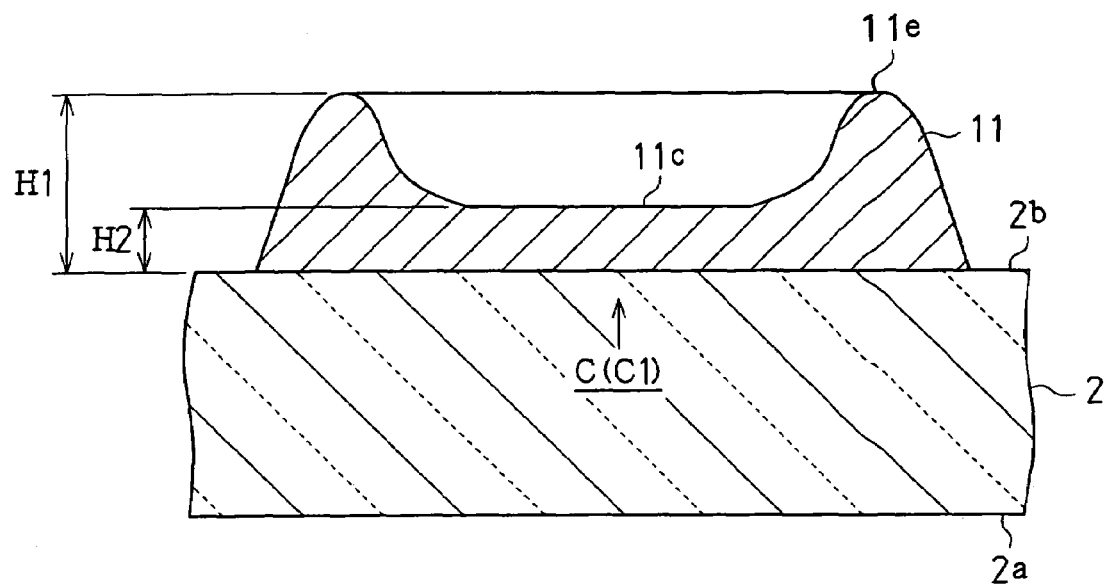
FIG. 3 is a lateral cross-sectional view showing the identification code.
Figure 4:
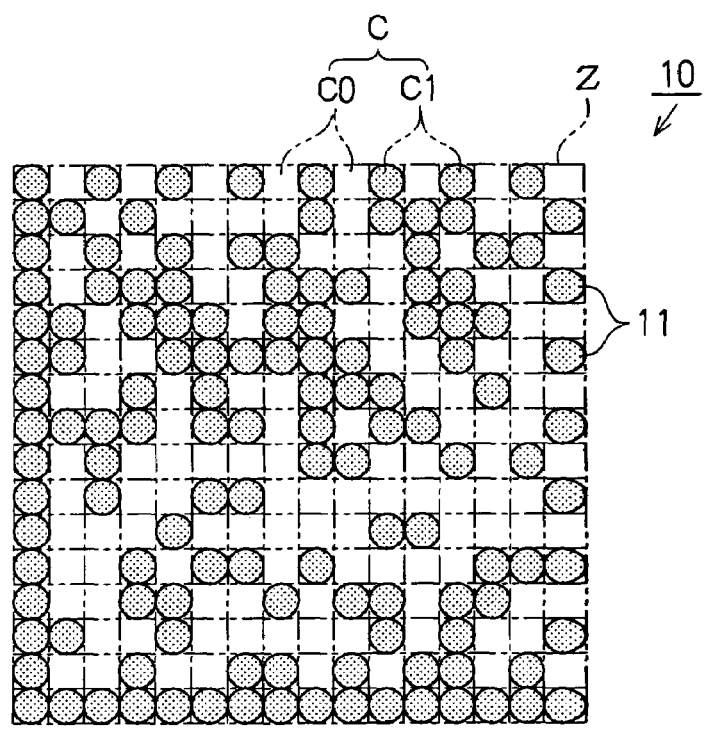
FIG. 4 is a diagram for explaining the configuration of the identification code.

An identification code 10 formed on the substrate 2 will hereafter be explained. FIGS. 2 and 3 are a front view and a lateral cross-sectional view, respectively, showing the identification code 10 formed on a backside 2b of the substrate 2. FIG. 4 is a view for explaining the configuration of the identification code 10.

Referring to FIG. 1, the identification code 10 is provided in the upper right corner of the backside 2b of the substrate 2. The identification code 10 represents product information including the manufacturer and the product number of the liquid crystal display 1. As shown in FIG. 2, the identification code 10 includes a plurality of dots 11 formed in a code formation area Z provided on the substrate 2. As shown in FIG. 2, the dots 11 are arranged in such a manner as to form a predetermined pattern. The identification code 10 is determined in correspondence with the arrangement pattern of the dots 11.

As shown in FIG. 4, the code formation area Z is defined as a square area. The code formation area Z is hypothetically divided into uniform dot forming sections (data cells C) that define a matrix of 16 rows by 16 columns. The size of the code formation area Z is 1.12 millimeters by 1.12 millimeters and the size of each data cell C is 70 micrometers by 70 micrometers. In the illustrated embodiment, the rows of the data cells C are defined as orderly numbered from a first row to a sixteenth row from an uppermost row to a lowermost row as viewed in FIG. 4.

As shown in FIG. 2, each of the dots 11 has a substantially circular shape as viewed from above. To form each dot 11, a microdroplet 35 (see FIG. 8) of functional liquid L (see FIG. 8) is ejected onto a corresponding one of the data cells C. The functional liquid L contains metal particles (for example, manganese particles) as dot forming material. The microdroplets 35 received by the corresponding data cells C (as indicated by the double-dotted lines in FIG. 8) are then dried and sintered to complete the dots 11.

More specifically, the dots 11 are formed in the data cells C selected in correspondence with the encoded product information in a desired size (for example, 70 percent or greater of the surface area of each data cell C). This forms the identification code 10 that indicates the product information. By reading the identification code 10 by a predetermined reader (not shown), the product information is obtained. The identification code 10 of the illustrated embodiment is formed by a two-dimensional code, which includes data cells C having the dots 11 (black data cells C1) and empty data cells C (white data cells C0).

As shown in FIG. 3, each dot 11 includes a flat portion 11c formed in the center of the dot 11 and a projection lie arranged in the vicinity of an outer circumferential portion (a peripheral portion) of the dot 11. The projection lie encompasses the flat portion 11c and extends along the entire circumference of the dot 11. The thickness of the projection 11e (a projection thickness H1) is greater than the thickness of the flat portion 11c (a flat portion thickness H2). In other words, the height of the projection 11e (the projection height H1) is greater than the height of the flat portion 11c (the flat portion height H2). Thus, when the dot 11 on the backside 2b of the substrate 2 contacts and scrapes against an object, an outer circumferential portion (the projection 11e) of the dot 11 contacts the object before the central portion (the flat portion 11c) of the dot 11.

This structure allows the projection 11e of each dot 11 to suppress separation of the flat portion 11c. Thus, even if the dot 11 scrapes against the object, both the projection 11e and the flat portion 11c are maintained in the corresponding data cell C. This improves the bonding strength of each dot 11 as a whole with respect to the data cells C, preventing loss of the product information.

The inventor of the present invention found that the ratio of the projection thickness H1 to the flat portion thickness H2 can be controlled to a desired value by raising the actual temperature of the substrate 2 (the actual substrate temperature Ta) before the microdroplet 35 is received by the substrate 2, or pre-drying the microdroplet 35 by the heat of the substrate 2 heated to a predetermined temperature. More specifically, such heating of the substrate 2 (pre-drying of the microdroplet 35) increases the drying speed of an outer circumferential portion of each microdroplet 35 (indicated by the double-dotted broken lines in FIG. 8), causing the metal particulates of the microdroplet 35 to move toward the outer circumferential portion.

Table 1 represents the relationship between the actual substrate temperature Ta and the ratio of the projection thickness H1 to the flat portion thickness H2 (thickness ratio R:H1/H2). The thickness ratio R is also referred to as the ratio of the projection height H1 to the flat portion height H2 (height ratio R). The dots 11 of Table 1 have been obtained by pre-drying the microdroplets 35 having equal weights at different actual substrate temperatures Ta. The dots 11 thus have equal average thicknesses but different thickness ratios R.

As indicated by Table 1, as the actual substrate temperature Ta rises, the drying speed of the outer circumferential portion of each microdroplet 35 increases. The projection thickness H1 thus correspondingly increases (the flat portion thickness H2 decreases), increasing the thickness ratio R. In other words, as the actual substrate temperature Ta increases, the flat portion thickness H2 decreases and the projection thickness H1 increases correspondingly.

Scratch tests have been performed on the dots 11 with the thickness ratios R of Table 1 (2.4 to 8.2) in order to obtain the thickness ratio R that maximizes the bonding strength of each dot 11. The dot 11 having the obtained thickness ratio R has been formed at the corresponding actual substrate temperature Ta. In Table 1, the degree of the bonding strength of each dot 11 is represented by indices ×, Δ, and ○. The bonding strength represented by these indices becomes greater in this order.

Referring to Table 1, as the thickness ratio R of the dot 11 increases from 2.4 to 7, the bonding strength of the dot 11 increases. The bonding strength of the dot 11 rapidly drops once the thickness ratio R reaches 7. In other words, the bonding strength of the dot 11 improves as the projection amount of the projection lie increases. Such bonding strength is maximized as long as the thickness ratio R (4<R<7) is satisfied. As the thickness ratio R becomes greater than or equal to 7, the flat portion thickness H2 becomes excessively small. The projection 11e thus easily collapses.

Accordingly, in the illustrated embodiment, the dots 11 satisfying the condition of the thickness ratio R (4<R<7) are formed by heating the substrates 2 to a corresponding actual substrate temperature Ta (a target substrate temperature Tp: in this embodiment, 30 to 50 degrees Celsius).

Thus, even if the identification code 10 scrapes against an object, each dot 11 is maintained as a whole in the corresponding data cell C. That is, the ratio of the surface area of each dot 11 to that of the data cell C is maintained. The product information is thus reliably prevented from being lost.

TABLE 1

|  | Actual Substrate Temperature Ta (° C.) | | | | |
| --- | --- | --- | --- | --- | --- |
|  | 20 | 30 | 50 | 70 | 100 |
| Thickness Ratio R (H1/H2) | 2.4 | 4.3 | 6.2 | 7.1 | 8.2 |
| Bonding Strength | Δ | ○ | ○ | X | X |

Figure 5:
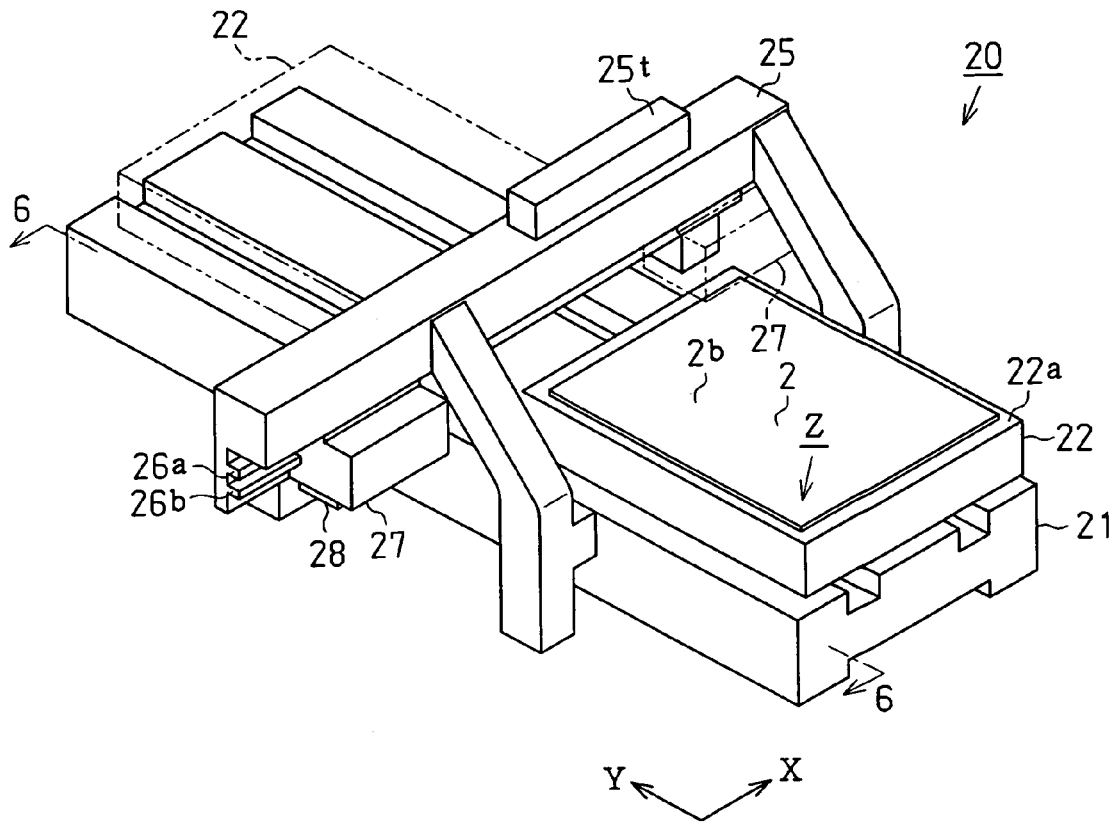
FIG. 5 is a perspective view schematically showing a liquid droplet ejection apparatus.

A method for forming the identification code 10 will hereafter be described, starting from a liquid droplet ejection apparatus 20 that forms the identification code 10. FIG. 5 is a perspective view showing the liquid droplet ejection apparatus 20 and FIG. 6 is a cross-sectional view taken along line 6-6 of FIG. 5, showing the apparatus 20.

As shown in FIG. 5, the liquid droplet ejection apparatus 20 has a support table 21 and a transport table (mounting table) 22 mounted on the support table 21. An y-axis driver mechanism including an y-axis motor MY of FIG. 9 permits the transport table 22 to linearly reciprocate along a longitudinal direction of the support table 21 (direction Y in FIG. 5). The substrate 2 is mounted on an upper surface, or a mounting surface 22a, of the transport table 22 in such a manner that the backside 2b of the substrate 2, or the code formation area Z, is exposed upwardly. More specifically, the code formation area Z is defined on the backside 2b in such a manner that the columns of the data cells C each extend in direction Y, and the first row of the data cells C is located foremost with respect to direction Y.

Figure 6:
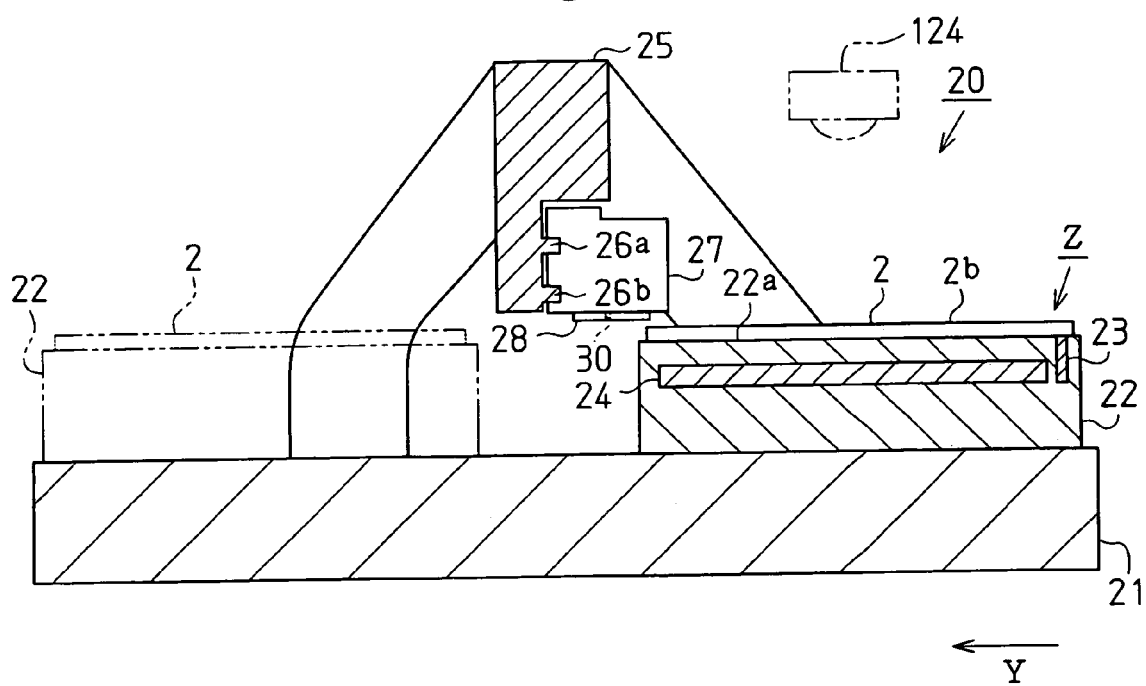
FIG. 6 is a cross-sectional view schematically showing the liquid droplet ejection apparatus.

As shown in FIG. 6, a temperature detector 23 serving as temperature detection means is provided in the mounting surface 22a and immediately below the code formation area Z. The temperature detector 23 is arranged with respect to the mounting surface 22a in such a manner that the temperature detector 23 is located in correspondence with the code formation area Z, or immediately below the code formation area Z, when the substrate 2 is mounted on the mounting surface 22a. The temperature detector 23 detects the temperature of the substrate 2, or, more specifically, the portion of the substrate 2 corresponding to the code formation area Z. A heater 24 serving as heating means (a heating device) is installed in the interior of the transport table 22 and thus heats the substrate 2 (the code formation area Z) through the transport table 22 (the mounting surface 22a).

The transport table 22 carrying the substrate 2 is transported in direction Y or a direction opposite to direction Y while the substrate 2 (the code formation area Z) is heated. In the illustrated embodiment, the position of the transport table 22 corresponding to a rightmost portion of the support table 21 as viewed in FIGS. 5 and 6 is defined as an advancement position (as indicated by the corresponding solid lines in the drawings). The position of the transport table 22 corresponding to a leftmost portion of the support table 21 as viewed in FIGS. 5 and 6 is defined as a retreat position (as indicated by the corresponding double-dotted broken lines in the drawings).

As shown in FIG. 5, a gate-like support frame 25 is provided over the support table 21 and extends in a direction perpendicular to direction Y (direction X). The support frame 25 straddles the transport table 22 that moves along direction Y. The support frame 25 includes a pair of upper and lower guide rails 26a, 26b, which extend in direction X. A carriage 27 is slidably supported by the guide rails 26a, 26b and driven by an x-axis driver mechanism including an x-axis motor MX of FIG. 9 to linearly reciprocate along the guide rails 26a, 26b. A droplet ejection head 28, or liquid droplet ejection means (droplet ejection portion), is formed on a lower surface of the carriage 27. A reservoir 25t is mounted on an upper side of the support frame 25 and retains the functional liquid L (see FIG. 8). The functional liquid L contains the metal particles dispersed in a dispersion medium. The reservoir 25t supplies the functional liquid L to the interior of the droplet ejection head 28.

Figure 7:
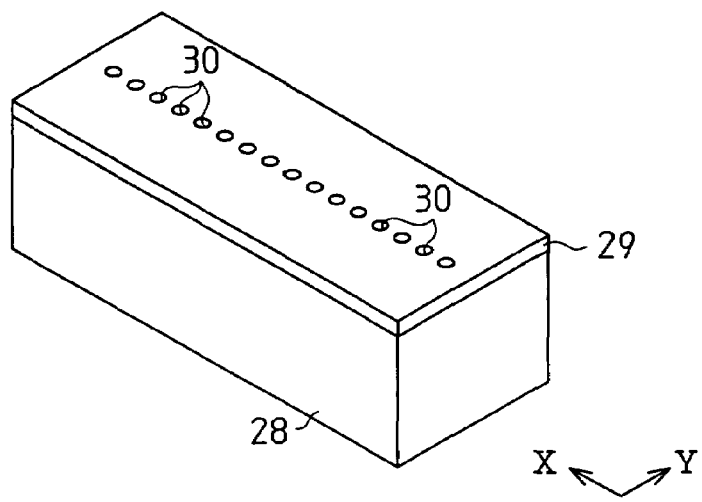
FIG. 7 is a perspective view schematically showing a droplet ejection head.
Figure 8:
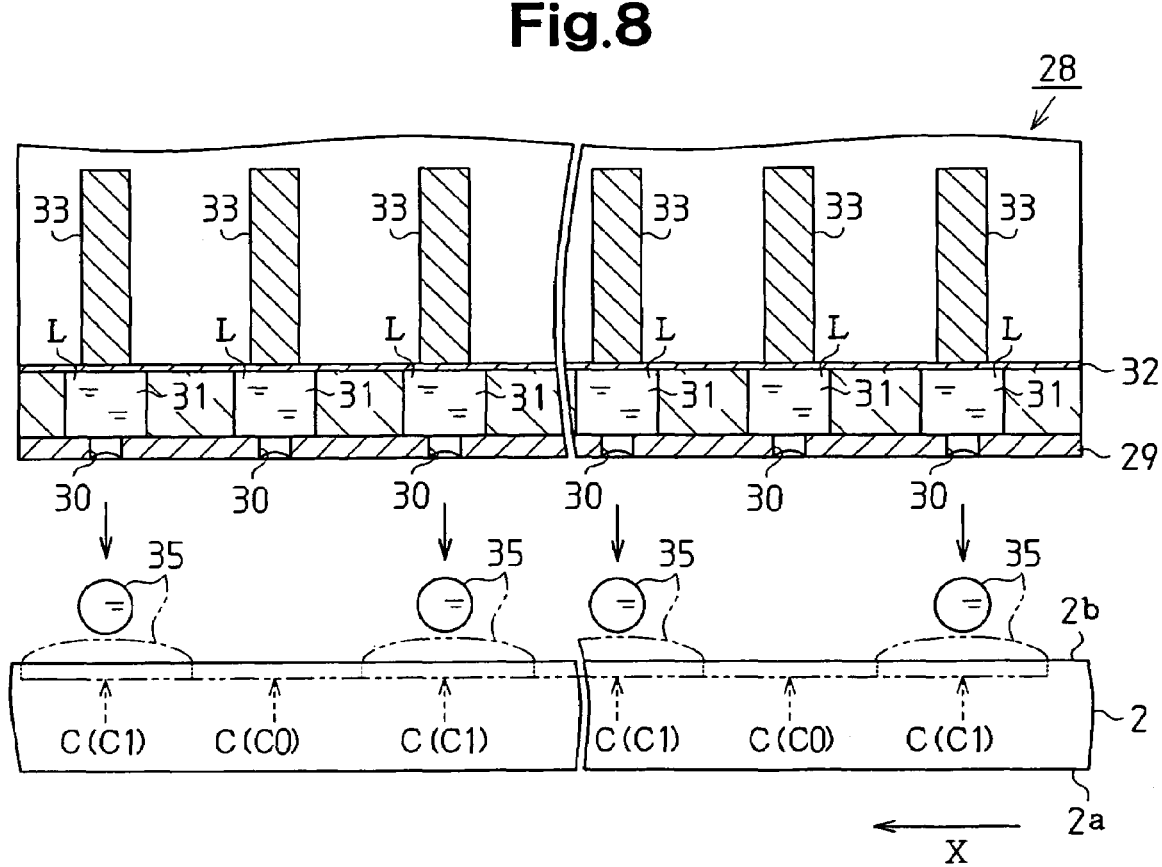
FIG. 8 is a cross-sectional view schematically showing the droplet ejection head.

FIG. 7 is a perspective view showing the droplet ejection head 28 with the lower surface of the droplet ejection head 28 facing upward. FIG. 8 is a cross-sectional view schematically showing the droplet ejection head 28. A nozzle plate 29 is provided at a lower side of the droplet ejection head 28. A lower surface of the nozzle plate 29 opposes and extends parallel with the backside 2b (the code formation area Z) of the substrate 2 mounted on the transport table 22. The nozzle plate 29 has sixteen droplet ejection nozzles 30 by which the dots 11 are formed. The droplet ejection nozzles 30 extend through the nozzle plate 29 and are aligned in a longitudinal direction of the nozzle plate 29 (in direction X, or in a direction defined by each row of the data cells C in the code formation area Z) as equally spaced.

In the illustrated embodiment, the droplet ejection nozzles 30 are arranged at a pitch equal to the pitch of the columns of the data cells C (70 micrometers in this embodiment). In other words, when the substrate 2 (the code formation area Z) linearly reciprocates along direction Y, each droplet ejection nozzle 30 opposes one of the columns of the data cells C.

Referring to FIG. 8, cavities 31 are defined in the droplet ejection head 28 at positions above the nozzle plate 29 and opposed to the droplet ejection nozzles 30. The cavities 31 communicate with the reservoir 25t and the functional liquid L is supplied from the reservoir 25t to the droplet ejection nozzles 30 through the cavities 31. An oscillation plate 32 is provided above the cavities 31 and a plurality of piezoelectric elements 33 are arranged in correspondence with the cavities 31. Each of the piezoelectric elements 33 flexibly deforms in a vertical direction and causes the oscillation plate 32 to oscillate correspondingly in such a manner as to selectively increase and decrease the volume of the corresponding cavity 31.

When the droplet ejection head 28 receives a signal (an ejection signal) for driving any one of the piezoelectric elements 33, the corresponding piezoelectric element 33 is deformed to decrease the volume of the corresponding cavity 31. The functional liquid L is thus ejected from the corresponding droplet ejection nozzle 30 as the microdroplet 35 by an amount corresponding to the decreased volume of the cavity 31.

The electric configuration of the liquid droplet ejection apparatus 20, which is constructed as above-described, will now be described with reference to FIG. 9.

Figure 9:
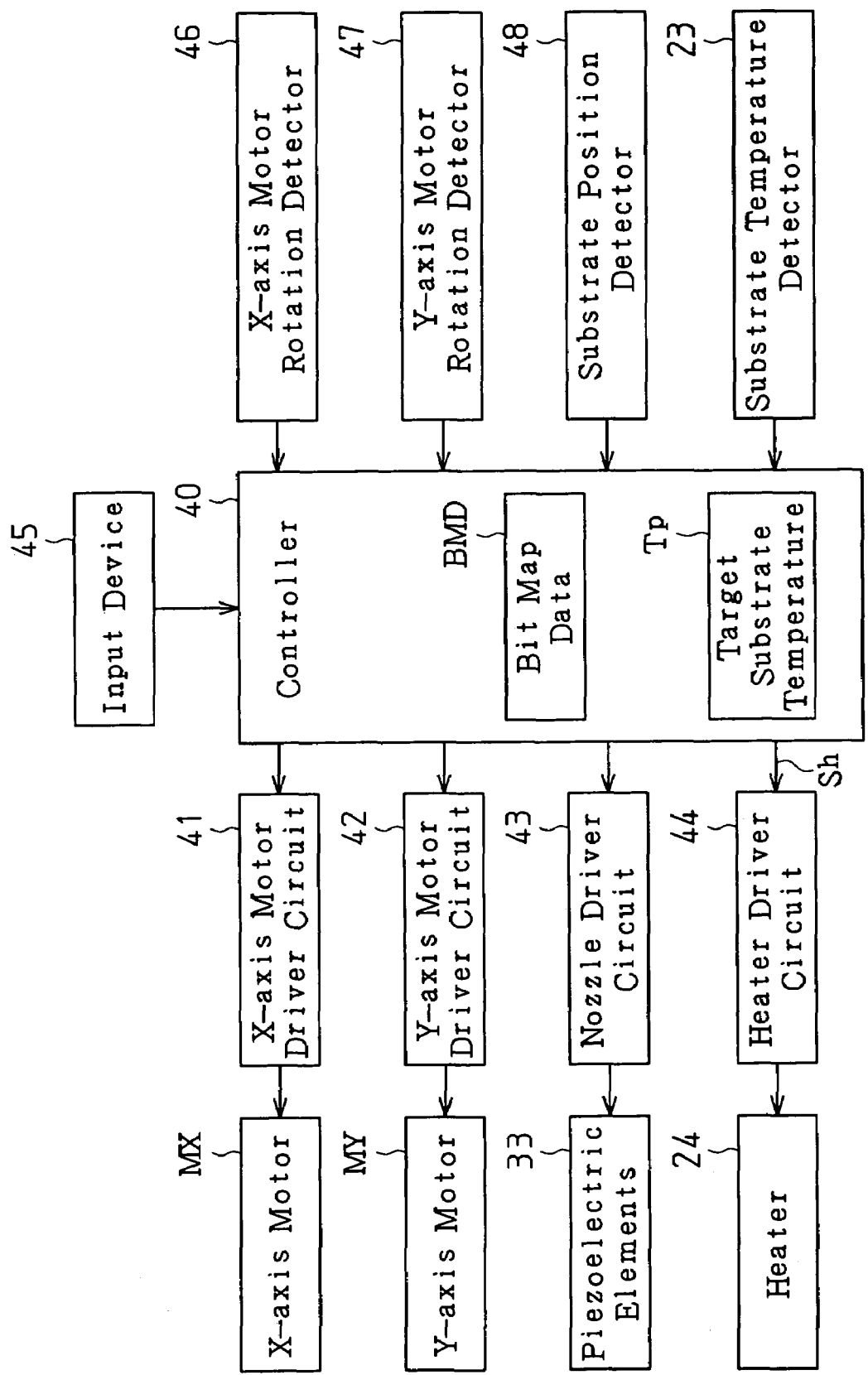
FIG. 9 is a block diagram representing the electric configuration of the liquid droplet ejection apparatus.

Referring to FIG. 9, a controller 40, or control means, includes a CPU, a RAM, and a ROM. The controller 40 performs a liquid droplet ejection procedure in accordance with a control program and an identification code formation program that are stored in the ROM. In the procedure, the controller 40 performs a transport procedure for the substrate 2 by moving the transport table 22 while carrying out a liquid ejection procedure by activating the droplet ejection head 28 (the piezoelectric elements 33).

The ROM stores a bit map data BMD used for forming the identification code 10 on the substrate 2 in advance. To generate the bit map data BMD, the product information including the manufacturer and the product number is encoded into a two-dimensional code data format of 16 rows by 16 columns using a publicly known method. The encoded data is then converted to the bit map data BMD in relation to the sixteen droplet ejection nozzles 30. That is, in accordance with the bit map data BMD, it is indicated whether or not each of the droplet ejection nozzles 30 should eject the microdroplet 35 onto the corresponding one of the sixteen data cells C of the column opposed to the droplet ejection nozzles 30, when the substrate 2 (the code formation area Z) move along direction Y.

The ROM stores the target substrate temperature Tp in advance. In the illustrated embodiment, the target substrate temperature Tp is set to 30 to 50 degrees Celsius so that the thickness ratio R of each dot 11 becomes greater than 4 and smaller than 7. However, since the target substrate temperature Tp may differ depending on the boiling point of the dispersion medium of the microdroplets 35, the target substrate temperature Tp may be altered as necessary.

An x-axis motor driver circuit 41 is connected to the controller 40 and receives an x-axis motor drive signal from the controller 40. In response to the x-axis motor drive signal, the x-axis motor driver circuit 41 operates to rotate the x-axis motor MX of the x-axis driver mechanism, in a positive or negative direction. For example, by rotating the x-axis motor MX in the positive direction, the carriage 27 is moved in direction X. When the x-axis motor MX is rotated in the negative direction, the carriage 27 is moved in the direction opposite to direction X.

An y-axis motor driver circuit 42 is connected to the controller 40 and receives an y-axis motor drive signal from the controller 40. In response to the y-axis motor drive signal, the y-axis motor driver circuit 42 operates to rotate the y-axis motor MY of the y-axis driver mechanism in a positive or negative direction. For example, by rotating the y-axis motor MY in the positive direction, the transport table 22 is moved in direction Y. When the y-axis motor MY is rotated in the negative direction, the transport table 22 is moved in the direction opposite to direction Y.

A nozzle driver circuit 43 is connected to the controller 40. The controller 40 generates ejection timing signals at predetermined ejection timings of the microdroplets 35. In correspondence with the timing signals, the controller 40 outputs ejection signals to the nozzle driver circuit 43. In response to the ejection signals, the nozzle driver circuit 43 supplies the power to the instructed ones of the piezoelectric elements 33 of the droplet ejection head 28 and activates the piezoelectric elements 33. This causes the droplet ejection nozzles 30 corresponding to these piezoelectric elements 33 to eject the microdroplets 35.

A heater driver circuit 44 is connected to the controller 40 and receives a heater drive signal Sh from the controller 40. In response to the heater drive signal Sh, the heater driver circuit 44 supplies an electric current to the heater 24 and activates the heater 24. The substrate 2 (the code formation area Z) mounted on the transport table 22 is thus heated by the heater 24.

An input device 45 is connected to the controller 40 and includes manipulation switches such as a start switch and a stop switch. In correspondence with manipulation of these switches, the input device 45 outputs manipulation signals to the controller 40.

An x-axis motor rotation detector 46 is connected to the controller 40 and sends a detection signal to the controller 40. In response to the detection signal, the controller 40 detects the rotational direction and the rotation amount of the x-axis motor MX. The controller 40 thus calculates the movement direction and the movement amount (the current position) of the droplet ejection head 28 relative to the substrate 2 with respect to direction X.

A y-axis motor rotation detector 47 is connected to the controller 40 and sends a detection signal to the controller 40. In response to the detection signal, the controller 40 detects the rotational direction and the rotation amount of the y-axis motor MY. The controller 40 thus calculates the movement direction and the movement amount (the current position) of the substrate 2 relative to the droplet ejection head 28 with respect to direction Y.

A substrate position detector 48 is connected to the controller 40. The substrate position detector 48 has image acquiring function, or detects an end of the substrate 2. Using the substrate position detector 48, the controller 40 calculates the position of the substrate 2 that passes immediately below the droplet ejection head 28.

The controller 40 is connected to the temperature detector 23 and receives a detection signal St from the temperature detector 23. In correspondence with the detection signal St, the controller 40 calculates the actual substrate temperature Ta of the substrate 2 (the code formation area Z). In correspondence with the calculation result and the target substrate temperature Tp stored in the ROM, the controller 40 generates the heater drive signal Sh so as to adjust the actual substrate temperature Ta to the target substrate temperature Tp.

A method for forming the identification code 10 with the droplet ejection apparatus 20 will be explained as follows.

First, in the state of FIG. 5 in which the transport table 22 is located at the advancement position, the substrate 2 is arranged on and secured to the transport table 22 with the backside 2b faced upward. At this stage, the manipulation signal is generated through the input device 45 to instruct formation of the identification code 10. This causes the controller 40 to read out the identification code formation program from the ROM. The controller 40 thus calculates the actual substrate temperature Ta of the substrate 2 in correspondence with the detection signal St of the temperature detector 23. The controller 40 then reads out the target substrate temperature Tp from the ROM. In correspondence with the calculated actual substrate temperature Ta and the target substrate temperature Tp, the controller 40 generates the heater drive signal Sh for adjusting the temperature of the substrate 2 (the actual substrate temperature Ta) to the target substrate temperature Tp. The heater drive signal Sh is then sent to the heater driver circuit 44. In this manner, the controller 40 adjusts the actual substrate temperature Ta of the substrate 2 to the target substrate temperature Tp by means of the heater driver circuit 44.

The controller 40 continuously generates the heater drive signals Sh to maintain the actual substrate temperature Ta at the target substrate temperature Tp until all of the data cells that are to become the black cells C1 of the code formation area Z receive the microdroplets 35.

When the actual substrate temperature Ta reaches the target substrate temperature Tp, the controller 40 actuates the y-axis motor MY to transport the transport table 22 (the substrate 2) in direction Y. The substrate position detector 48 thus detects the end of the substrate 2 that extends in a manner intersecting direction Y. This causes the controller 40 to actuate the x-axis motor MX to move the carriage 27 (the droplet ejection nozzles 30) at a position immediately above the moving path (along direction Y) of the code formation area Z. The controller 40 reads out the bit map data BMD regarding the substrate 2 from the ROM and stands by until the controller 40 must generate the ejection signal in accordance with the bit map data BMD. In other words, while transporting the substrate 2 in direction Y, the controller 40 determines whether or not the code formation area Z (the first row of the data cells C) reaches a position immediately below the droplet ejection head 28 (the droplet ejection nozzles 30) in correspondence with the detection signal of the y-axis motor rotation detector 47.

When the first row of the data cells C reach the position immediately below the droplet ejection nozzles 30, the controller 40 generates the ejection timing signal. The controller 40 then extracts the data corresponding to the first row of the data cells C from the bit map data BMD. The controller 40 thus produces the ejection signal based on the extracted data and sends the ejection signal to the nozzle driver circuit 43, thereby causing only the droplet ejection nozzles 30 opposed to the data cells C that are to become the black cells C1 to eject the microdroplets 35. The ejected microdroplets 35 are thus received by the corresponding data cells C.

At this stage, the actual substrate temperature Ta is maintained at the target substrate temperature Tp. Thus, the microdroplets 35 are pre-dried and fixedly maintained in the corresponding data cells C with the projection 11e and the flat portion 11c having the thickness ratio R that is greater than 4 and smaller than 7.

Subsequently, the controller 40 repeats the above-described operation by generating the ejection timing signal when each row of the data cells C reaches the position immediately below the droplet ejection nozzles 30, sending the corresponding ejection signal to the nozzle driver circuit 43, and ejecting the microdroplets 35 onto the data cells C that are to become the black cells C1. In this manner, all of the data cells C that are to become the black cells C1 are provided with the pre-dried dots 11 having the projections 11e.

When all of the dots 11 are formed in the pre-dried states, the controller 40 ends ejection of droplets by the droplet ejection apparatus 20. The controller 40 then operates the y-axis motor MY to return the substrate 2 from the position below the droplet ejection head 28 to the advancement position.

When the droplet ejection step is ended, the substrate 2 is transported to a predetermined drying-sintering furnace and thus subjected to main drying. The metal particles are thus sintered. As a result, the dots 11, which each have the projection 11e and the flat portion 11c having the thickness ratio R that is greater than 4 and smaller than 7, are formed in the corresponding data cells C. That is, the identification code 10 is formed on the substrate 2.

The illustrated embodiment has the following advantages.

(1) In the illustrated embodiment, the projection lie is provided in the vicinity of the outer circumferential portion (the peripheral portion) of each dot 11, extending along the entire circumference of the dot 11. The projection thickness H1 of the projection 11e is greater than the flat portion thickness H2 of the center of the dot 11. Therefore, if any one of the dots 11 forming the identification code 10 contacts and scrapes against an object, the projection 11e of the dot 11 contacts the object before the flat portion 11c. The projection 11e thus suppresses separation of the flat portion 11c. Accordingly, even if the dot 11 scrapes against the object, both the projection 11e and the flat portion 11c are, or the dot 11 as a whole is, maintained in the corresponding data cell C. The product information of the substrate 2 is thus saved.

(2) In the illustrated embodiment, based on the thickness ratio R that has been obtained for maximizing the bonding strength of each dot 11, the identification code 10 is formed by the dots 11 having the thickness ratio R that is greater than 4 and smaller than 7. Accordingly, since the thickness ratio R is optimal, the loss of the product information of the substrate 2 becomes further unlikely.

(3) In the illustrated embodiment, when forming the projection 11e and the flat portion 11c of each dot 11, the thickness ratio R is set to a value greater than 4 and smaller than 7 by raising the actual substrate temperature Ta and thus pre-drying the microdroplet 35. It is thus unnecessary to perform additional steps for increasing the thickness of the outer circumferential portion of each dot 11 or reducing the thickness of the center of the dot 11 after the dot 11 is formed. Accordingly, without increasing the number of the manufacture steps of the identification code 10, the product information of the substrate 2 is prevented from being lost.

(4) In the illustrated embodiment, the substrate 2 (the code formation area Z) is heated to the target substrate temperature Tp by the heater 24 provided in the transport table 22. Accordingly, the microdroplets 35 are received by the code formation area Z that has been reliably heated to the target substrate temperature Tp. As a result, the projection 11e and the flat portion 11c having the preferable thickness ratio R are formed further reliably.

The illustrated embodiment may be modified as follows.

In the illustrated embodiment, the thickness ratio R is set to a value greater than 4 and smaller than 7. However, the thickness ratio R that maximizes the bonding strength of each dot 11 differs depending on the material or the shape of the dot 11. Accordingly, the condition of the thickness ratio R may be changed in any other suitable manner as long as the dot 11 has the projection 11e and improves the bonding strength with respect to the data cell C.

In the illustrated embodiment, the heating means (the heating device) is formed by the heater 24 having a heating element. However, as indicated by the double-dotted line in FIG. 6, the heating means (the heating device) may be formed by a light source 124 such as a lamp (for example, an infrared lamp) or a laser device (for example, an infrared laser). In this case, the light source 124 irradiates the code formation area Z with light having a wavelength (for example, an infrared wavelength) that permits optical heat exchange with the substrate 2.

In this manner, the code formation area Z is heated in a non-contact manner. The code formation area Z is thus reliably heated to the target substrate temperature Tp, regardless of the configuration of the substrate 2 (that is, regardless of whether or not there are convex and concave portions in the backside 2*b* or the surface 2*a*). Accordingly, the dots 11 having the preferable thickness ration R are provided further reliably.

In the illustrated embodiment, the substrate 2 is transported to the drying-sintering furnace after the ejection of droplets is completed. The microdroplets 35 are thus subjected to main drying and sintering of the metal particles.

However, the carriage 27 may include a laser light source that radiates a laser beam (having, for example, a wavelength of approximately 800 nanometers) that dries the microdroplets 35 and sinters the metal particles. In this case, the dots 11 are formed by radiating the laser beam onto the black cells C1 (the microdroplets 35) sequentially from the first row to the sixteenth row.

This saves the time for transporting the substrate 2 to the furnace, thus further improving the productivity of the identification code 10.

In the illustrated embodiment, each dot 11 is formed of the metal particles. However, the dot 11 may be formed of pigment or any other suitable material as long as the dot 11 is readable by a code reader.

In the illustrated embodiment, each dot 11 is formed by a single microdroplet 35. However, the dot 11 may be formed by multiple microdroplets 35.

In the illustrated embodiment, each dot 11 has a circular shape as viewed from above. However, as long as the dot 11 has a projection in the peripheral portion of the dot 11, the dot 11 may be shaped, for example, oval or linear.

In the illustrated embodiment, the identification code 10 is formed by the two-dimensional code. However, instead of this, the identification code 10 may be formed by a bar code, a character, a numeral, or a mark.

In the illustrated embodiment, prior to the ejection of droplets, the surface treatment (such as cleansing treatment using oxygen plasma) may be performed on the backside 2*b* so as to improve the bonding strength between each dot 11 and the backside 2*b*. This further reliably improves the bonding strength of the dot 11.

In the illustrated embodiment, the substrate 2 provided with the identification code 10 is formed by a transparent glass substrate. However, the substrate 2 may be formed by, for example, a flexible substrate or a rigid circuit substrate used in the liquid crystal display 1.

In the illustrated embodiment, the electro-optic apparatus is embodied as the liquid crystal display 1. However, the electro-optic apparatus may be, for example, an organic electroluminescence display or a field effect device (FED or SED) having flat electron emission elements. A field effect device radiates electrons emitted by the electron emission elements onto a fluorescent substance, thus causing the fluorescent substance to emit light.

The present examples and embodiments are to be considered as illustrative and not restrictive and the invention is not to be limited to the details given herein, but may be modified within the scope and equivalence of the appended claims.

The invention claimed is:

1. A substrate comprising:
 a dot bonded with the substrate, the dot being one of a plurality of dots that form an identification code in a code formation area provided on the substrate,
 wherein a plurality of data cells are defined by dividing the code formation area, wherein the dots are formed by ejecting liquid droplets containing a dot forming material onto predetermined data cells selected from the plurality of data cells so that the dots are arranged in the predetermined data cells, each dot including a projection formed in a peripheral portion of the dot and an encompassed portion encompassed by the peripheral portion, the projection being projected with respect to any part of the encompassed portion.

2. The substrate according to claim 1, wherein the projection extends along an entire circumference of each dot.

3. The substrate according to claim 1, wherein the projection has a height with respect to the substrate and the encompassed portion has a height with respect to the substrate, and wherein a ratio of the height of the projection to the height of the encompassed portion is greater than 4.

4. The substrate according to claim 1, wherein the projection has a height with respect to the substrate and the encompassed portion has a height with respect to the substrate, and wherein a ratio of the height of the projection to the height of the encompassed portion is less than 7.

5. The substrate according to claim 1, wherein the projection has a height with respect to the substrate and the encompassed portion has a height with respect to the substrate, and wherein a ratio of the height of the projection to the height of the encompassed portion is greater than 4 and less than 7.

6. The substrate according to claim 1, wherein the projection has a height with respect to the substrate and the encompassed portion has a height with respect to the substrate, and the height of the projection is greater than the height of any part of the encompassed portion.

7. The substrate according to claim 1, wherein the encompassed portion is planar.

8. The substrate according to claim 1, wherein the projection is annular.

9. A substrate comprising:
 a dot formed on the substrate by ejecting a liquid droplet containing a dot forming material onto the substrate,
 wherein the dot includes an annular projection formed in a peripheral portion of the dot to extend along an entire circumference of the dot and a planar portion occupying an entire portion of the dot encompassed by the annular projection, and
 wherein the annular projection has a height with respect to the substrate and the planar portion has a height with respect to the substrate, and the height of the annular projection is greater than the height of any part of the planar portion.

* * * * *